(12) United States Patent
Besse et al.

(10) Patent No.: US 11,932,410 B2
(45) Date of Patent: Mar. 19, 2024

(54) PROPULSION SYSTEM FOR AN AIRCRAFT

(71) Applicants: SAFRAN, Paris (FR); SAFRAN HELICOPTER ENGINES, Bordes (FR)

(72) Inventors: Jean-Louis Robert Guy Besse, Moissy-Cramayel (FR); Ye-Bonne Karina Maldonado, Moissy-Cramayel (FR)

(73) Assignees: SAFRAN, Paris (FR); SAFRAN HELICOPTER ENGINES, Bordes (FR)

( * ) Notice: Subject to any disclaimer, the term of this patent is extended or adjusted under 35 U.S.C. 154(b) by 160 days.

(21) Appl. No.: 17/767,576

(22) PCT Filed: Oct. 12, 2020

(86) PCT No.: PCT/FR2020/051797
§ 371 (c)(1),
(2) Date: Apr. 8, 2022

(87) PCT Pub. No.: WO2021/074513
PCT Pub. Date: Apr. 22, 2021

(65) Prior Publication Data
US 2023/0145551 A1 May 11, 2023

(30) Foreign Application Priority Data
Oct. 16, 2019 (FR) ...................................... 1911535

(51) Int. Cl.
*B64D 29/00* (2006.01)
*F01D 5/02* (2006.01)
(Continued)

(52) U.S. Cl.
CPC ............... *B64D 29/00* (2013.01); *F01D 5/02* (2013.01); *F01D 25/005* (2013.01); *F02K 1/002* (2013.01);
(Continued)

(58) Field of Classification Search
CPC .......... B64D 29/00; F01D 5/02; F01D 25/005
See application file for complete search history.

(56) References Cited

U.S. PATENT DOCUMENTS

| 4,049,199 | A | * | 9/1977 | Nightingale | .......... F02K 1/1261 239/265.39 |
| 5,328,098 | A | * | 7/1994 | Barcza | ................... F02K 1/1269 60/230 |
| 2011/0030380 | A1 | * | 2/2011 | Widdle, Jr. | ............. F02K 1/386 239/265.33 |

FOREIGN PATENT DOCUMENTS

EP 2 184 481 A2 5/2010
FR 2 310 471 A1 12/1976

OTHER PUBLICATIONS

International Search Report dated Jan. 22, 2021, issued in corresponding International Application No. PCT/FR2020/051797, filed Oct. 12, 2020, 5 pages.
(Continued)

*Primary Examiner* — Justin M Benedik
(74) *Attorney, Agent, or Firm* — CHRISTENSEN O'CONNOR JOHNSON KINDNESS PLLC

(57) ABSTRACT

A propulsion system for an aircraft includes a rotor and a nacelle fairing that extends around the rotor in relation to an axis. The nacelle fairing includes an upstream portion forming an inlet section of the nacelle fairing as well as a downstream portion, a downstream end of which forms an outlet section of the nacelle fairing. The downstream portion includes radially inner and outer walls, both of which are made of a deformable shape memory material. The wall has
(Continued)

independently actuatable piston actuator mechanisms, each actuator mechanism being actuatable independently of the others and being designed to cooperate with means built into an inner surface of the wall to deform the wall in a radial direction in relation to the axis under the effect of a predetermined displacement command.

9 Claims, 5 Drawing Sheets

(51) Int. Cl.
     *F01D 25/00*      (2006.01)
     *F02K 1/00*      (2006.01)
(52) U.S. Cl.
     CPC ...... *F05D 2220/90* (2013.01); *F05D 2240/20* (2013.01); *F05D 2300/505* (2013.01)

(56) References Cited

OTHER PUBLICATIONS

Written Opinion dated Jan. 22, 2021, issued in corresponding International Application No. PCT/FR2020/051797, filed Oct. 12, 2020, 6 pages.
English translation of Written Opinion dated Jan. 22, 2021, issued in corresponding International Application No. PCT/FR2020/051797, filed Oct. 12, 2020, 6 pages.
International Preliminary Report on Patentability dated Apr. 19, 2022, issued in corresponding International Application No. PCT/FR2020/051797, filed Oct. 12, 2020, 7 pages.

* cited by examiner

PROPULSION SYSTEM FOR AN AIRCRAFT

TECHNICAL FIELD

The present invention relates to the field of the propulsion systems for aircraft. In particular, it relates to a propulsion system capable of providing a lateral thrust component.

The present invention also relates to an aircraft comprising such a propulsion system.

PRIOR ART

The technical background comprises in particular the documents US 2011/030380 A1, EP 2184481 A2, U.S. Pat. No. 5,328,098 A1 and FR 2310471 A1.

A propulsion system for aircraft comprises at least one rotor or a propeller comprising a plurality of blades mounted on a rotating shaft.

There are aircrafts, and in particular Vertical Take-Off and Landing (VTOL) Aircraft, with single rotor propulsion systems when they comprise only one rotor or counter-rotating when they comprise rotors grouped in pairs turning in opposite directions.

These propulsion systems are either with shrouded rotors (the rotor is then surrounded by an annular nacelle fairing), or with free rotors, the propulsion systems and in particular the rotors (free or shrouded) being able to be mounted on a pivot shaft allowing the orientation of the propulsion systems and thus of the rotors between a vertical position and a horizontal position, for example the vertical orientation for a vertical take-off or landing and the horizontal orientation for forward flight or airplane flight mode.

The shrouded rotors have several interesting advantages, such as:
- a significant reduction in the sound signature of the rotor in direct emission;
- a protection of the blades of the rotor from surrounding obstacles;
- an improvement in the performance of the rotor, in particular in hovering flight of the aircraft or at low forward speed.

However, the VTOL aircrafts with shrouded rotors, in particular in hovering flight, do not have the same manoeuvrability as the conventional helicopters.

For conventional helicopters, altitude and placement corrections can be made, in the X, Y, Z aeronautical standards reference trihedral, by:
- corrections around the roll axis X (axis of rotation of the helicopter around its longitudinal axis) by a left or right action on the cyclic pitch (acting on the orientation of the thrust of the rotor, here in a plane perpendicular to the axis X);
- corrections around the pitch axis Y (axis of the helicopter around its transverse axis) by an action forward (nose down) or backward (nose up) on the cyclic pitch (acting on the orientation of the thrust of the rotor, here in a plane perpendicular to the axis Y);
- corrections around the yaw axis Z (axis of rotation in a horizontal plane of the helicopter around its vertical axis) by action on the rudder (acting on the thrust of the anti-torque rotor of the helicopter);
- corrections in longitudinal translation along the axis X of the reference trihedral in aeronautical standards (longitudinal axis) by a command of the cyclic/collective pitch (acting on the orientation of the thrust of the rotor, here forward or backward);
- corrections in lateral translation according to the axis Y of the reference trihedral in aeronautical standards (transverse axis) by a command of the cyclic/collective pitch, (acting on the orientation of the thrust of the rotor, here towards the right or the left);
- corrections in vertical translation along the reference axis Z by a command of the collective pitch upwards, downwards (acting on the thrust of the rotor, setting pitch: command pulled upwards).

Of course, coordinated corrections of the collective pitch and of the rudder, well known to pilots, are required to counter the induced effects of loss of lift component and torque effect.

For the VTOL aircrafts with shrouded rotors, the positioning corrections, or the corrections allowing to counteract gusty winds in hovering flight, are usually complex and make the flight uncomfortable for the passengers of the aircraft.

For example, in the case of a quadrotor aircraft (i.e. an aircraft with four rotors), in order to make a correction in the direction of the reference axis X, it is necessary to tilt the aircraft forward about the reference axis Y (along the pitch axis), then to make a correction of the position reached (for example to counter a gust of wind) and to return quickly to a neutral position, referred to as "flat". Similarly, in order to make a correction in the direction of the reference axis Y, it is necessary to tilt, i.e. roll, the aircraft towards and around the reference axis X (along the roll axis), then make a correction of the position reached and quickly return to a neutral position. With such a quadrotor, when transporting passengers, they may experience front/back and/or right/left sways.

A gas turbine engine has been proposed comprising a two-dimensional nozzle comprising a flexible panel capable of changing position, under the action of a cylinder, so as to regulate the exhaust of the engine.

Gas turbine engines comprising variable nozzle geometries have also been proposed, so that an outlet surface area of the nozzle can be varied.

Thus, these proposed solutions propose nozzles in which the two-dimensional vector thrust technology is implemented.

However, none of these proposed solutions proposes the implementation of the three-dimensional vector thrust technology in the nacelle fairings of propulsion systems, in particular in the VTOL mode with rotors, guiding the secondary flow resulting from said rotors.

There is therefore a need to provide a simple and effective solution to the above problems.

A purpose of the present invention is to provide a solution allowing to improve the manoeuvrability of the VTOL type aircrafts, while reducing the weight and aeronautical loss impacts associated with the flight commands.

In particular, the invention proposes to improve the manoeuvrability of the VTOL aircrafts by providing a propulsion system capable of providing a thrust component lateral to the axis of the rotors.

SUMMARY OF THE INVENTION

To this end, the invention relates to a propulsion system for an aircraft, comprising at least one rotor and a nacelle fairing extending around said at least one rotor with respect to an axis of rotation of said rotor, this nacelle fairing comprising an upstream section forming an inlet cross-section of the nacelle fairing and a downstream section, a downstream end of which forms an outlet cross-section of the nacelle fairing; and characterised in that the downstream section comprises a radially internal wall and a radially external wall made of a deformable shape-memory material, and in that the radially external wall comprises a plurality of actuator mechanisms with at least one cylinder, each actuator mechanism being operable independently of the other actuator mechanisms and being configured to cooperate with means embedded in an internal surface of the radially external wall so as to deform the radially external wall in a radial direction with respect to the axis of rotation, under the effect of a predetermined displacement command.

The propulsion system according to the invention can be with single rotor or counter-rotating rotors, installed in a stationary or pivoting nacelle, with a through or offset pivoting axis.

According to the invention, the fairing is constituted at its air outlet by a semi-deformable shape-memory material and by a plurality of actuator mechanisms with cylinders configured to automatically vary the shape of the nacelle and, consequently, the orientation of the air flow at its outlet, in order to manoeuvre the aircraft on which said nacelle is installed.

The profile of the fairing advantageously has a semi-rigid downstream portion whose dimensions and shape of the trailing edge outlet cross-section can be varied, so that the trailing edge outlet cross-section can be oriented laterally under the effect of a controlled device, to form a current tube producing a thrust with a lateral component, referred to as vectoral or oriented thrust.

The propulsion system according to the invention thus allows to improve the manoeuvrability of the aircraft in which it is installed, in particular during manoeuvres at low forward speed, such as take-offs and landings, while minimizing the noise pollution induced by the rotor of the propulsion system and ensuring a safety of this rotor by the presence of the nacelle fairing.

In fact, the shape of the fairing is continuously adapted according to the deflection of the controlled thrust to obtain a precise placement of the aircraft. The profile of the fairing can thus be oriented laterally according to the mechanical constraints of the flight sought in VTOL mode, so as to produce a thrust component perpendicular to the rotor axis.

The actuator mechanism with cylinders allows advantageously a relatively rigid realization of the rear portion of the fairing, and an activation with short response time.

During the flight phases in airplane mode, the actuator mechanism with cylinders, which is useful during the phases with low forward speed, can be deactivated.

According to an embodiment, the means comprise a plurality of prisms distributed on the internal surface of the radially external wall in at least one annular row.

Advantageously, the prisms may be angularly equidistant on the internal surface of the radially external wall.

In an embodiment, the prisms are actuated by the cylinders by means of at least one annular element.

Advantageously, the cylinders are angularly equidistant in the downstream section.

According to an embodiment, the plurality of actuator mechanisms with at least one cylinder comprises a first actuator mechanism with at least one cylinder, wherein the cylinder is configured to cooperate with the means so as to deform the radially external wall in a first radial direction relative to the axis of rotation, under the effect of a predetermined displacement command, and a second actuator mechanism with at least one cylinder, wherein the cylinder is configured to cooperate with the means so as to deform the radially external wall in a second direction which is opposite to the first direction, under the effect of a predetermined displacement command.

Advantageously, the propulsion system also comprises stiffening bridges connecting the radially internal and radially external walls of the downstream section and allowing to ensure a substantially constant distance between the radially internal and radially external walls of the downstream section.

The nacelle fairing may comprise an upstream section forming an inlet cross-section of the nacelle fairing and an intermediate section connecting the upstream and downstream sections.

Advantageously, the intermediate section is rigid and is connected by at least one mast to an engine of the propulsion system. This provides to the nacelle fairing of the propulsion system a rigid structure that can ensure a shielding function.

The present invention also relates to an aircraft characterised in that it comprises at least one propulsion system having at least one of the above-mentioned characteristics, the propulsion system being mounted so as to pivot on the aircraft by means of a pivot shaft that is offset from or passes through the rotor.

BRIEF DESCRIPTION OF FIGURES

The invention will be better understood and other details, characteristics and advantages of the present invention will become clearer from the following description made by way of non-limiting example and with reference to the attached drawings, in which.

The elements having the same functions in the different embodiments have the same references in the figures.

DESCRIPTION OF THE EMBODIMENTS

In this disclosure, the terms "axial," "internal," and "external" are used in reference to the axis of rotation of the propulsion system according to the invention.

A propulsion system generally consists:
of a nacelle;
of an engine and its command and control system;
and, in the case of a propeller or rotor propulsion, of its propeller or rotor or rotors.

The nacelle is the element which allows to integrate the engine with the aircraft, it is made up:
of nacelle fairings (allowing to cover the engine, to shroud the rotors, to capture the air flow during the operation of the aircraft, to create a thrust effect, to reverse the thrust on the propulsion systems, etc.);
of equipment to be mounted on the engine (such as the engine build-up unit—EBU, including the electrical, hydraulic and pneumatic networks); and
of systems for attachment to the aircraft.

Figure 1A:
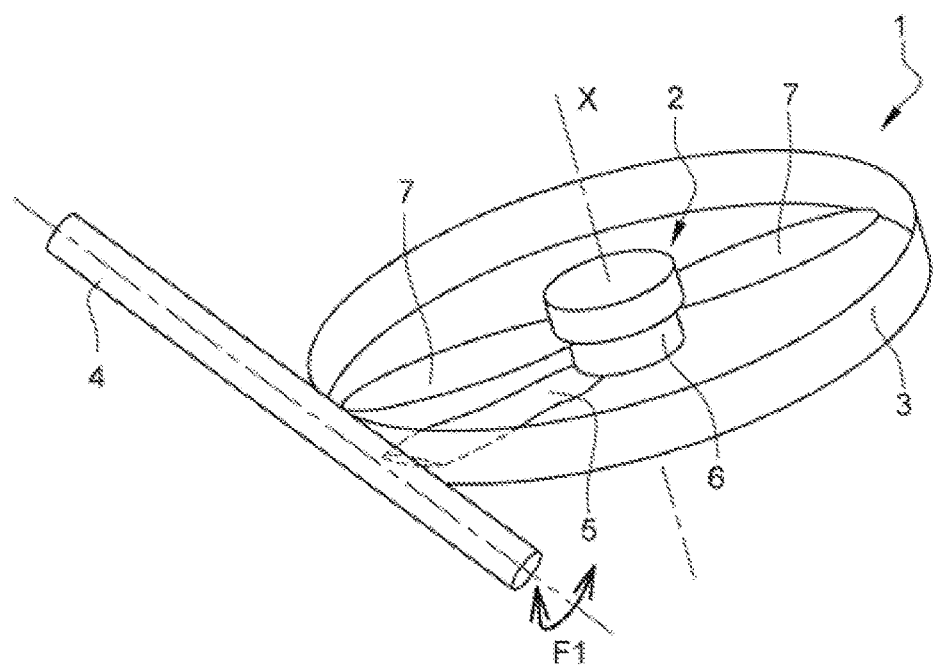
FIG. 1Aa is a schematic perspective view of a first embodiment of a propulsion system shown with a nacelle mounted on an offset pivot axis, the propulsion system being in a horizontal position.
Figure 1B:
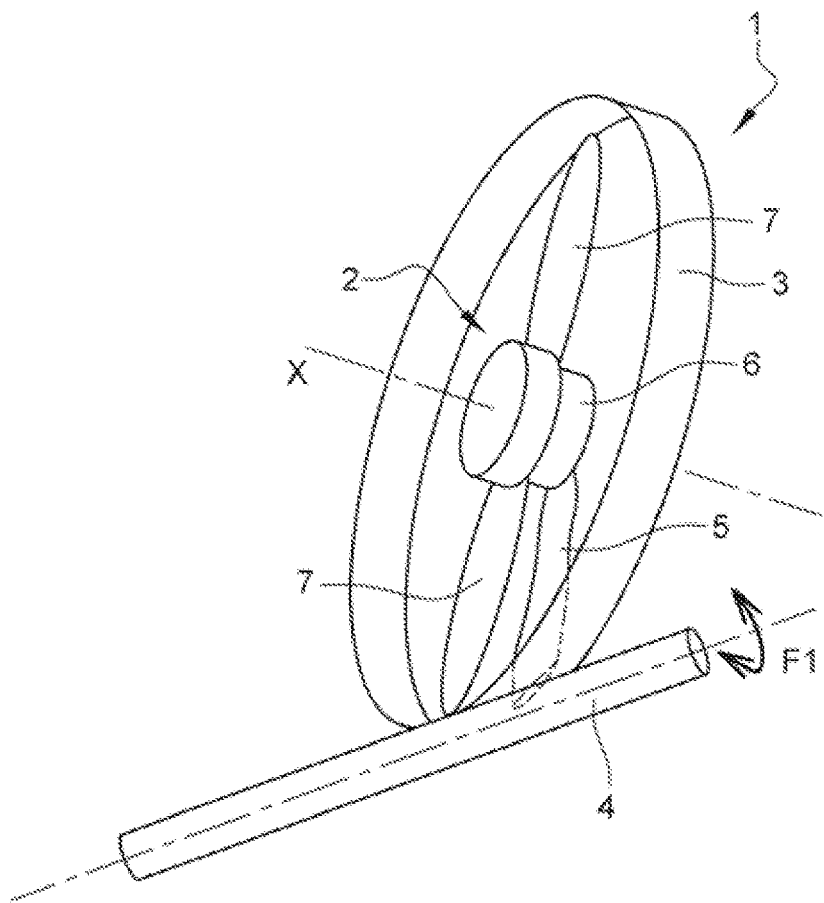
FIG. 1B is a view similar to FIG. 1A, showing the propulsion system in a vertical position.

FIGS. 1A and 1B illustrate, in a simplified manner, a first embodiment of an aircraft propulsion system 1 according to the invention.

Here, the propulsion system 1 comprises at least one rotor 2 and one nacelle fairing 3 extending around said at least one rotor 2 with respect to a rotation axis X of the rotor 2. The fairing 3 advantageously acts, by its shape and its materials, as a sound barrier. The propulsion system 1 can be fixedly mounted on the aircraft. The propulsion system 1 can also be mounted on a pivot shaft 4, offset from the axis of rotation X of the rotor 2. The pivot shaft 4 is attached by any means to the propulsion system 1, on the one hand, and to the aircraft, on the other hand, and allows the orientation of the propulsion system 1 on the aircraft, authorizing the tilting of the propulsion system 1 around the pivot shaft 4, according to the arrow F1, by means of known actuators, between a horizontal position as illustrated in FIG. 1A, and a vertical position as illustrated in FIG. 1B. This tilting allows the aircraft to be switched from a conventional aircraft mode to a VTOL or helicopter mode.

The rotor 2 of the propulsion system 1 is connected to the aircraft by a mast 5 supporting an engine 6, for example an electric motor, which drives the rotor 2 in rotation by means of a power shaft, in a manner known per se. According to the illustrated example in a non-limiting way, each rotor 2 comprises two blades 7.

Figure 1C:
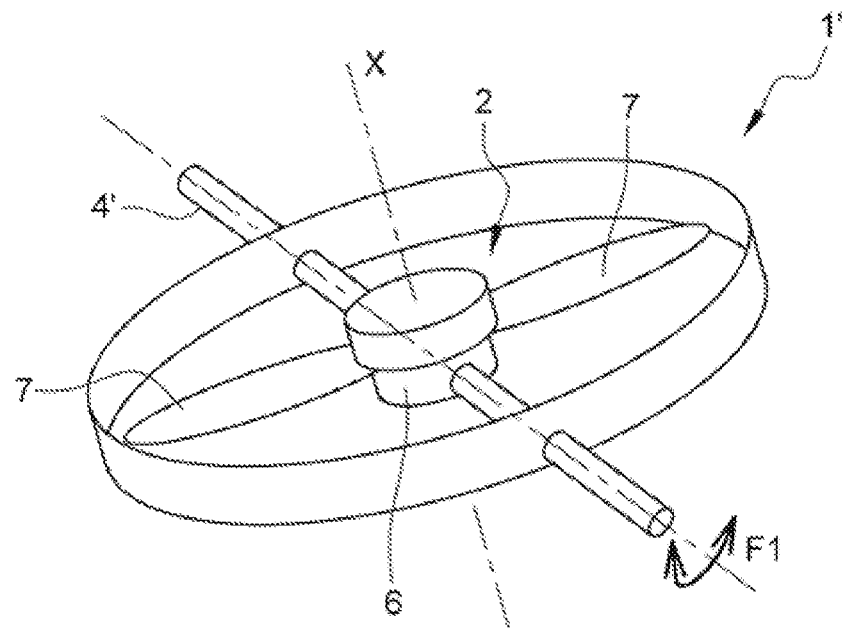
FIG. 1C is a schematic perspective view of a second embodiment of a propulsion system shown with a nacelle mounted on a through pivot axis, the propulsion system being in horizontal position.

FIG. 1C illustrates a second embodiment of an aircraft propulsion system 1' according to the invention in which the propulsion system 1' can be mounted on a pivot shaft 4', passing through the rotor 2 perpendicular to the axis of rotation X of the rotor 2. The rotor 2 of the propulsion system 1' is connected to the aircraft by a mast 5 supporting an engine 6, for example an electric motor, which drives the rotor 2 in rotation by means of a power shaft, in a manner known per se. According to the embodiment, the mast 5 of the rotor 2 is merged with the pivot shaft 4'.

Figure 2:
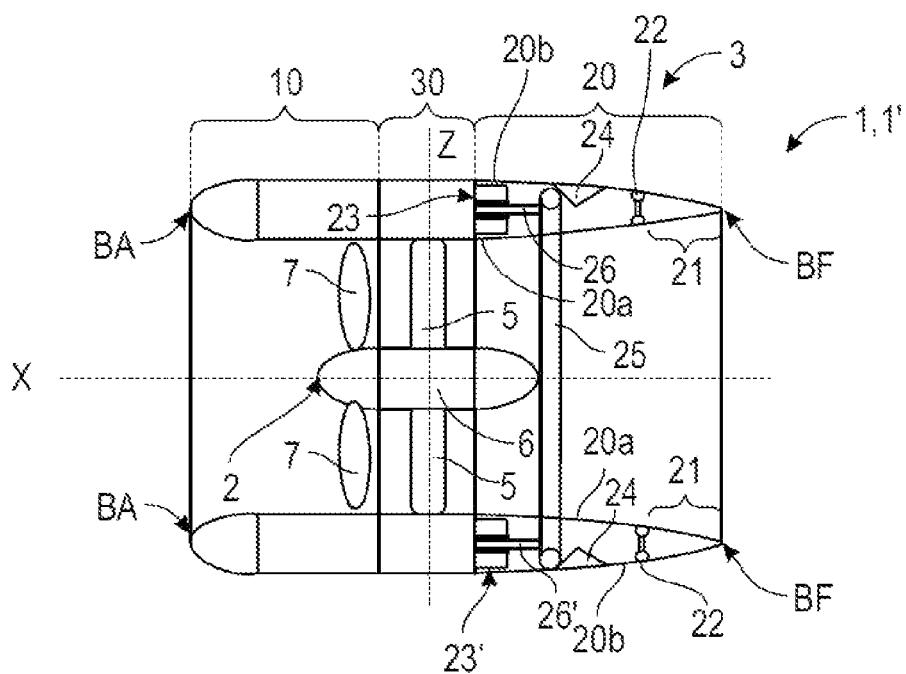
FIG. 2 is a schematic view in longitudinal cross-section of the propulsion system according to the invention with its downstream section of nacelle fairing in symmetrical thrust mode, i.e. axial thrust.
Figure 3:
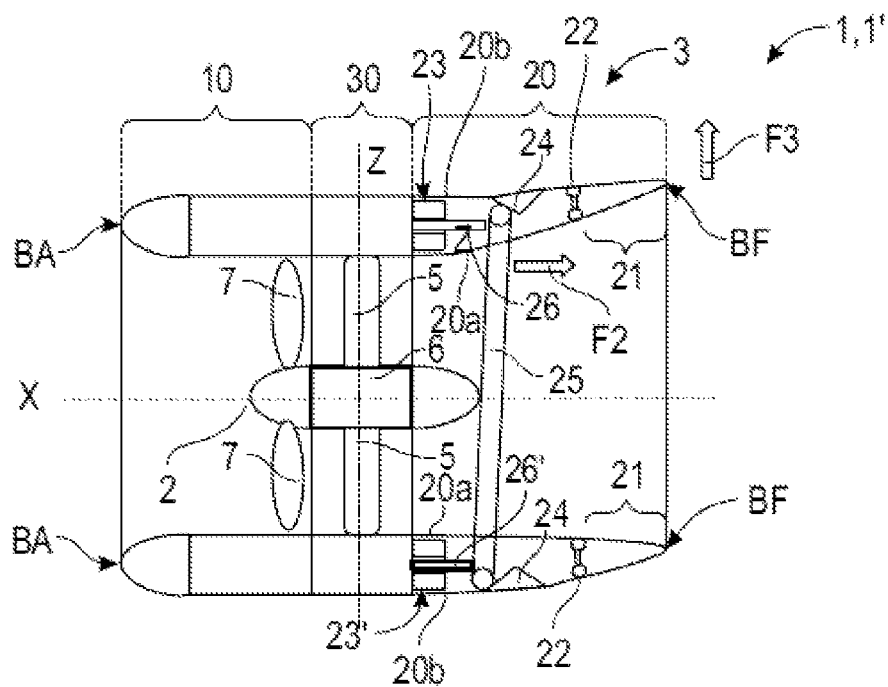
FIGS. 3 and 4 are views similar to FIG. 2 of the propulsion system according to the invention with its downstream section of nacelle fairing in asymmetric thrust mode.
Figure 4:
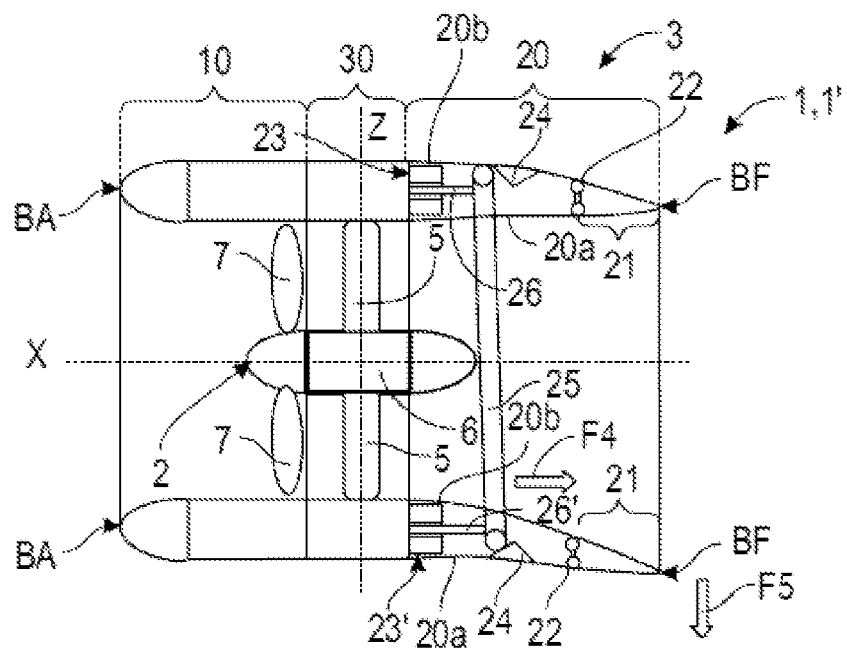

With reference to FIGS. 2 to 4, the nacelle fairing 3 of the propulsion system 1, 1' according to the invention comprises:
an upstream section 10;
a downstream section 20; and
an intermediate section 30 connecting said upstream 10 and downstream 20 section.

The upstream section 10 forms an inlet cross-section (or in other words a leading edge) BA or air inlet of the nacelle fairing 3.

The upstream section 10 is made of a material that can withstand temperatures that make it suitable for anti-icing when supplied with hot air.

The intermediate section 30 is rigid. It is for example made of aluminium alloy, 6% aluminium and 4% vanadium (TA6V) filled titanium, or organic matrix carbon fibre composite. The intermediate section 30 is advantageously connected to the engine 6 of the propulsion system 1, 1' by at least one mast 5, and preferably by two masts 5 so as to mechanically fit the nacelle fairing 3 to the engine 6 of the propulsion system 1, 1'. The intermediate section 30 thus confers, by its material and its configuration, a shielding function to the propulsion system 1, 1'.

A downstream end 21 of the downstream section 20 forms an outlet cross-section (or in another word a trailing edge) BF or an air outlet of the nacelle fairing 3.

The downstream section 20 comprises a radially internal wall 20a and a radially external wall 20b. The radially internal 20a and radially external 20b walls of the downstream section 20 not only provide a structural function of the downstream section 20 but also an aerodynamic function.

The radially internal 20a and radially external 20b walls of the downstream section 20 are made of a semi-rigid deformable shape-memory material. In other words, the material constituting the radially internal 20a and radially external 20b walls of the downstream section 20 is both rigid to provide the downstream section 20 with a structural shape and flexible to provide the downstream section 20 with a deformability. Thus, the radially internal 20a and radially external 20b walls of the downstream section 20 are made of a material able to react under the effect of actuators as described below. When the radially internal 20a and radially external 20b walls of the downstream section 20 are energized by one or more actuators, the walls deform and when the energizing stress of the actuator or of the actuators stop, the walls return to their original shape. For example, the radially internal 20a and external 20b walls are made of a composite or a nickel-titanium alloy (also referred to as "Kiokalloy") such as NiTiNol or NiTiCu.

The shape-memory material constituting the radially internal 20a and external 20b walls is fail-safe, i.e. it is such that its rest position, in other words when no actuator acts on the shape-memory material to deform it, corresponds to a natural storage geometry of said material or to a longer duration of use. Thus, in case of failure of the actuator, the shape-memory material will return to its natural shape at rest and the nacelle fairing 3 will return to a safe geometry ensuring an axial thrust to ensure the proper operation of the propulsion system 1, 1' of the aircraft.

The radially internal 20a and external 20b walls may also have a varying thickness axially and also azimuthally in the vicinity of stiffening bridges 22 so as to locally modify the elasticity of the structure. It is further possible to locally optimize the mechanical characteristics of the shape-memory material constituting the radially internal 20a and external 20b walls according to the desired local properties along the downstream section Thus, it can be envisaged that the downstream section 20 consists of a plurality of sections of different materials.

The downstream section 20 is made of a deformable, semi-rigid material which guarantees a rigid structural shape so as to avoid its collapse both at rest and under the action of an air flow during operation of the propulsion system 1, 1' and thus allowing the nacelle fairing 3 to maintain a homogeneous aerodynamic profile of its outlet cross-section BF. Advantageously, the downstream end 21 of the downstream section 20 can be made of an orthotropic material with suitable elastic moduli.

In addition, in order to ensure a substantially constant distance between the radially internal 20a and radially external 20b walls of the downstream section 20, stiffening bridges 22 are provided at regular angular intervals between these walls 20a, 20b.

One purpose of the present invention is to be able to take advantage of a nacelle fairing 3 of the propulsion system 1, 1' whose outlet cross-section BF, as well as the shape of the latter, can be varied in order to direct the thrust of the propulsion system.

Thus, the downstream section 20 comprises means allowing for varying the shape of the outlet cross-section BF.

For this purpose, the downstream section 20 comprises a plurality of actuator mechanisms with cylinders 23, 23'. For example, the propulsion system 1, 1' may comprise two actuator mechanisms with cylinders 23, 23', one being for example angularly positioned at 6 o'clock, with reference to a time dial, (i.e., in the down position) when the propulsion system 1, 1' is mounted on an aircraft, the other being diametrically opposite, i.e., positioned at 12 o'clock, with reference to a time dial, (i.e., in the up position). Each actuator mechanism 23, 23' is configured to cooperate with means 24 integral with an internal surface 20b' of the radially external wall 20b, so as to deform the radially external wall 20b in a direction radial to the axis X of rotation, under the effect of a predetermined displacement command.

Specifically, for each actuator mechanism 23, 23', a cylinder arm 26, 26' is configured to extend or retract under the effect of the displacement command so as to act on and radially displace the means 24, causing a thrust on the radially internal surface 20b' of the radially external wall 20b and thereby vary the size and the shape of the outlet cross-section BF. Each cylinder 23, 23' can be in a retracted state or in a fully extended state. The actuator mechanism with cylinders 23, 23' can be electric, hydraulic, pneumatic or a screw-nut system.

The means 24 are arranged on different consecutive angular sectors around the axis X. One or more prisms may be associated with a single predetermined angular sector. Each actuator mechanism 23, 23' cooperates with means 24 which face the cylinder 23, 23', and which are thus associated with a predetermined angular sector, so as to deform the radially external wall 20b in a direction which is radial to the axis X of rotation and which is angularly centred on the predetermined angular sector over which the prisms associated with the cylinder extend.

The means 24 are, for example, embedded (e.g., by vulcanization) in the radially internal surface 20b' of the radially external wall 20b and move radially under the action of the actuator mechanisms with cylinders 23, 23'.

According to an embodiment, the means 24 comprise a plurality of prisms, for example of triangular cross-section, distributed in at least one annular row, this plurality of prisms being actuated by the cylinders 23, 23' by means of at least one annular element 25.

Preferably, the prisms 24 are angularly equidistant on the radially internal surface 20b' of the radially external wall 20b.

Advantageously, the contacting faces of the prisms 24 and the annular element 25 are covered with an anti-friction coating.

Each actuator mechanism 23, 23', and more specifically each cylinder, is operable independently of the other actuator mechanisms, and is configured to deform the radially external wall in a radial direction with respect to the axis of rotation X, under the effect of a predetermined displacement command.

For this purpose, each actuator mechanism 23, 23' is connected to an automatic device allowing to actuate or not the cylinder 23, 23' by applying a displacement command adapted according to the desired configuration for the nacelle fairing 3 to obtain the desired lateral thrust component. In particular, the automatic device operates the actuator mechanisms, and thus the cylinders 23, 23', independently of the other actuator mechanisms (and thus the other cylinders).

Preferably, the cylinders 23, 23' are angularly equidistant in the downstream section 20. According to the embodiment illustrated in FIGS. 2 to 7, the propulsion system 1, 1' comprises two actuator mechanisms with cylinders 23, 23': a first actuator mechanism with one cylinder 23 extending in a first portion (the upper portion in the figures) of the downstream section 20, and a second actuator mechanism with one cylinder 23' extending in a second portion (the lower portion in the figures) of the downstream section 20. In the figures, the actuator mechanisms with cylinders are shown in the upper (top) portion and lower (bottom) portion of the downstream section, but can of course be integrated in different angular sectors (e.g. right and left in the rear views), these angular sectors depending on the orientation of the propulsion system when installed on the aircraft. Of course, the invention is by no means limited to this embodiment, and the propulsion system 1, 1' may comprise more actuator mechanisms with cylinders.

Figure 5:
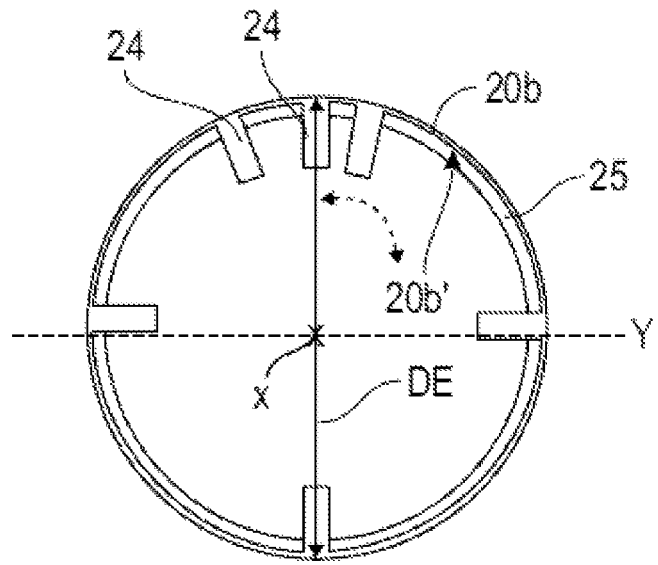
FIG. 5 is a schematic rear view of an embodiment of an actuator mechanism according to the invention, in axial thrust mode.

FIG. 2 shows a propulsion system 1, 1' according to the invention with the nacelle fairing 3 shown in the neutral position, i.e. in pure axial thrust. FIG. 5 shows the cylinders 23, 23' in this neutral position. The arms 26, 26' of the cylinders 23, 23' of the actuator mechanisms with cylinders 23, 23' are fully retracted. The radially internal wall 20a and the radially external wall 20b are in a state of zero extension (in other words, the walls 20a and 20b are at rest). The local deformation of the radially external wall 20b is then zero.

Figure 6:
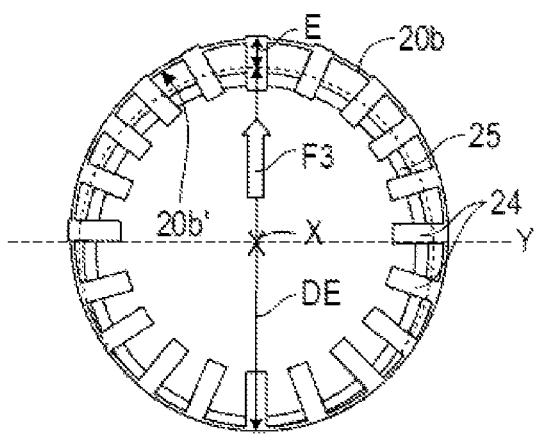
FIGS. 6 and 7 are schematic rear views of an embodiment of the actuator mechanism according to the invention, in asymmetrical thrust mode.
Figure 7:
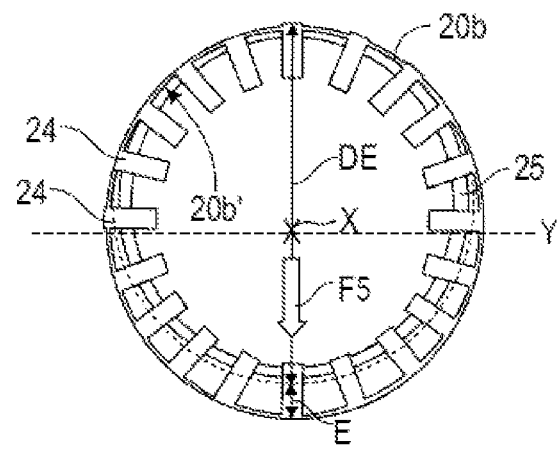

FIG. 3 shows a propulsion system 1, 1' according to the invention with the nacelle fairing 3 shown in an upwardly deflected flow position. FIG. 6 shows the radially external wall 20b and the prisms 24 when the actuator mechanisms with cylinders 23, 23' are in an asymmetric downward thrust position. A command to create a downward displacement of the nacelle requires deforming the output cross-section of the nacelle upward, so as to create a force directed from the top down. The actuator mechanism with cylinders 23 is actuated. Specifically, an extension setpoint is calculated based on the input of the flight command and then sent to the actuator mechanism with cylinders 23. The actuation of the actuator mechanism with cylinders 23 causes the cylinder arm 26 to extend, which causes the axial displacement of the upper portion of the annular element 25 (in the direction of the arrow F2 in FIG. 3), which in turn causes the radially external displacement of the row of opposing prisms 24 (in the direction of the arrow F3 in FIGS. 3 and 6). In particular, the annular element 25 moves on the faces of the prisms 24 facing the cylinder 23 so as to be, in the neutral position of the downstream section 20 of the nacelle fairing 3, in a position flushing with the internal surface 20b' of the radially external wall 20b and, in asymmetrical position of the downstream section 20 of the nacelle fairing 3, in a position close to the summits of the prisms 24 facing the cylinder 23. Because the prisms 24 are embedded in the radially internal surface 20b' of the radially external wall and the annular element 25 is rigid, the dimensions of the upper portion of the radially internal wall 20a increase under the effect of the radial thrust of the prisms 24. This increase of the dimensions leads to a change in the shape of the upper portion of the outlet cross-section BF. Indeed, the radially internal 20*a* and the radially external 20*b* walls of the downstream section 20 being made of a deformable material, the modification of the geometry of the radially external wall 20*b* leads to the modification of the geometry of the radially internal wall 20*a*, thanks in particular to the bridges 22, having the effect of making the downstream section of the nacelle fairing 3 change to an asymmetrical configuration such as illustrated in FIG. 6. The cooperation between the cylinder 23, the annular element 25 and the prisms 24 deforms the radially external wall 20*b* in a radial direction (arrow F3 in FIG. 6) with respect to the axis X of rotation and angularly centred with respect to the angular sector over which the prisms 24 associated with the cylinder 23 extend, i.e., vertically and upward in FIG. 6. The cylinder 23 is thus activated, while the cylinder 23' is not activated. In other words, the cylinder 23' is in the rest position. In particular, the lower portion of the annular element 25 does not move on the faces of the prisms 24 facing the cylinder 23'. The actuation of the cylinder 23 results in a local deformation, i.e. a local and radial expansion E of the outlet cross-section BF. The outlet cross-section of the fairing is therefore asymmetrical, and its shape results from the mechanical characteristics of the structure subjected to the thrust of the cylinder 23. When the cylinder 23 is activated, there is a radial and local expansion E of the outlet cross-section BF of the fairing 3, i.e. there is a local deflection of the structure on the side of the activated cylinder. The radial dimension (in the direction of the arrow F3) of the set of the actuator mechanisms with cylinders 23, 23' (the cylinder 23 being activated and the cylinder 23' being at rest) is equal to the sum of the radial dimension DE of the radially external wall 20*b* when the actuator mechanisms with cylinders are at rest and of the expansion E. The radially external wall 20*b* forms an annulus, a portion of which (in this case the upper portion) is deformed. There is a radial and local increase in the radially external wall 20*b* (at the level of the prisms 24 that face the upper actuated cylinder 23). FIG. 4 shows a propulsion system 1, 1' according to the invention with the nacelle fairing 3 shown in a position where the flow is deflected downwards. FIG. 7 shows the radially external wall 20*b* and the prisms 24 when the actuator mechanisms with cylinders 23, 23' are in an asymmetrical upward thrust position. A command to create an upward displacement of the nacelle requires deforming the output cross-section of the nacelle downward, so as to create a force directed from the bottom up. The actuator mechanism with cylinders 23' is activated. Specifically, an extension setpoint is calculated based on the input of the flight command and then sent to the actuator mechanism with cylinders 23'. The actuation of the actuator mechanism with cylinders 23' causes the extension of the arm 26' of the cylinder, which causes the axial displacement of the lower portion of the annular element 25 (in the direction of the arrow F4 in FIG. 4), which in turn causes the radially external displacement of the row of prisms 24 (in the direction of the arrow F5 in FIGS. 4 and 7). In particular, the annular element 25 moves on the faces of the prisms 24 facing the cylinder 23' so as to be, in the neutral position of the downstream section 20 of the nacelle fairing 3, in a position flushing with the internal surface 20*b*' of the radially external wall 20*b* and, in the asymmetrical position of the downstream section 20 of the nacelle fairing 3, in a position close to the summits of the prisms 24 facing the cylinder 23'. Because the prisms 24 are embedded in the radially internal surface 20*b*' of the radially external wall 20*b* and the annular element 25 is rigid, the dimensions of the upper portion of the radially internal wall 20*a* increase under the effect of the radial thrust of the prisms 24. This increase in dimensions leads to a change in the shape of the lower portion of the outlet cross-section BF. Indeed, the radially internal 20*a* and the radially external 20*b* walls of the downstream section 20 being made of a deformable material, the modification of the geometry of the radially external wall 20*b* leads to the modification of the geometry of the radially internal wall 20*a*, thanks in particular to the bridges 22, having the effect of making the downstream section of the nacelle fairing 3 change to an asymmetrical configuration such as illustrated in FIG. 7. The cooperation between the cylinder 23', the annular element 25 and the prisms 24 deforms the radially external wall 20*b* in a radial direction (arrow F5 in FIG. 7) with respect to the axis X of rotation and angularly centred with respect to the angular sector over which the prisms 24 associated with the cylinder 23' extend, i.e., vertically and downward in FIG. 7. The cylinder 23' is thus activated, while the cylinder 23 is not. In other words, the cylinder 23 is in the rest position. In particular, the upper portion of the annular element 25 does not move on the faces of the prisms 24 facing the cylinder 23. The actuation of the cylinder 23' results in a local deformation, i.e. a local and radial expansion E of the outlet cross-section BF. The outlet cross-section of the fairing is therefore asymmetrical, and its shape results from the mechanical characteristics of the structure subjected to the thrust of the cylinder 23'. When the cylinder 23' is activated, there is a radial and local expansion E of the outlet cross-section BF of the fairing 3, i.e. there is a local deflection of the structure on the side of the activated cylinder. The radial dimension (in the direction of the arrow F5) of the set of the actuator mechanisms with cylinders 23, 23' (the cylinder 23 being at rest and the cylinder 23' being activated) is equal to the sum of the radial dimension DE of the radially external wall 20*b* when the actuator mechanisms with cylinders are at rest and of the expansion E. The radially external wall 20*b* forms an annulus, a portion of which (in this case the lower portion) is deformed. There is a radial and local increase in the radially external wall 20*b* (at the level of the prisms 24 that face the lower cylinder 23' that is operated).

The gradual increase in the extension of the cylinders induced by the automatic device gradually changes the shape and the dimensions of the outlet cross-section BF. In particular, there is a deformation, radially to the axis X and locally, of the radially internal 20*a* and radially external 20*b* walls made of deformable shape-memory material of the downstream section 20 associated with the prisms facing the actuated cylinder. This consequently changes the dimensions and the shape of the outlet cross-section BF, which thus changes from a minimum radial dimension DE and a circular shape in the axial thrust mode configuration as shown in FIG. 2 to a radial dimension DE+E greater than the minimum radial dimension DE, with a deformation in at least one radial direction of the circular shape of the set of the actuators in the asymmetric thrust mode configuration of the nacelle fairing 3 as shown in FIGS. 3 and 4.

Similarly, the progressive reduction of the extension of the cylinders induced by the automatic device progressively shifts the nacelle fairing 3 from an asymmetrical thrust mode configuration as illustrated in FIGS. 3 and 4 to an axial thrust mode configuration as illustrated in FIG. 2.

The passage from the configuration of FIG. 5 to the configuration of FIG. 6 or FIG. 7 of the downstream section 20 of the nacelle fairing 3, and vice versa, is done continuously as a function of the extension or retraction of the arm 26, 26' of cylinder 23, 23' of the actuator mechanism with cylinders induced by the automatic device, the stiffening bridges 22 ensuring a substantially constant distance between the radially internal 20a and radially external 20b walls of the downstream section 20 during the changes of configuration of the outlet cross-section BF (dimensions and shape) of the nacelle fairing 3.

According to an embodiment, the propulsion system 1, 1' may comprise several rows of prisms 24, 24' and several actuator mechanisms with cylinders 23, 23' for each annular row of prisms 24, 24', independent of each other.

Advantageously, but in a non-limiting way, each annular row may comprise at least four prisms 24, 24' distributed azimuthally in an equidistant manner along the radially internal surface 20b' of the radially external wall 20b of the downstream section 20.

Figure 8:
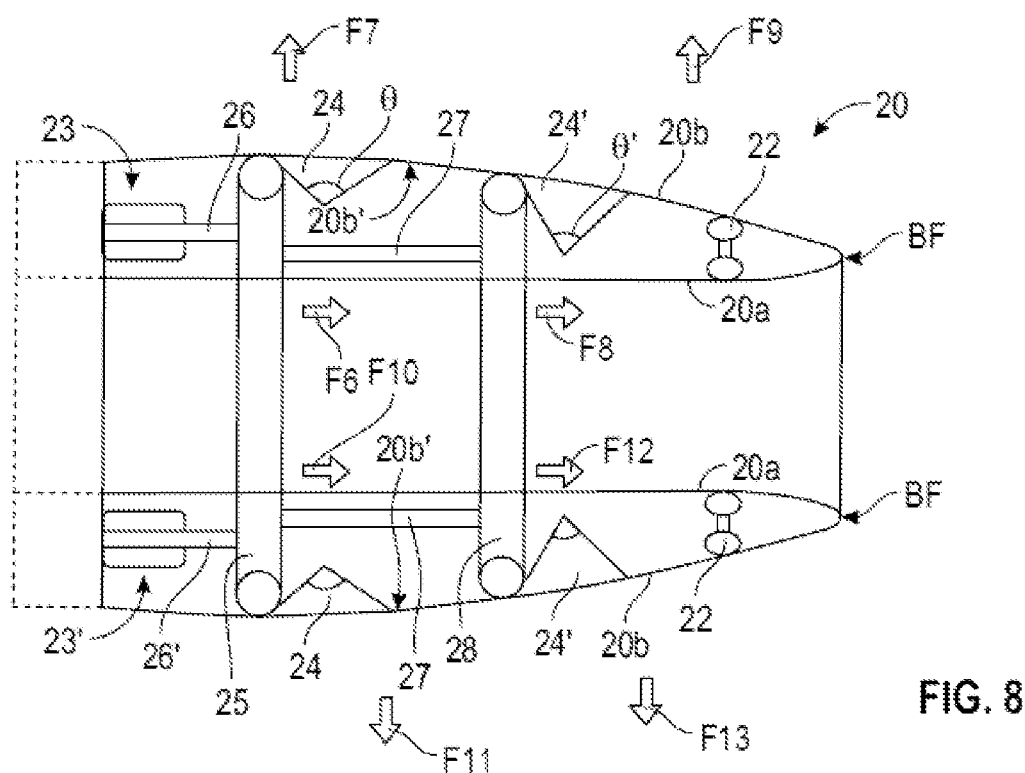
FIG. 8 is a schematic cross-sectional view of the propulsion system according to another embodiment of the invention with its downstream section of nacelle fairing in axial thrust mode.

With reference to FIG. 8, the means 24, 24' may comprise a plurality of prisms, for example of triangular cross-section, distributed in two annular rows. A first annular row of prisms 24 is connected to the or each arm 26, 26' of cylinder 23, 23' of the actuator mechanisms with cylinders 23, 23' by means of a first annular element 25. A second annular row of prisms 24' is connected to the first annular row of prisms 24, and more precisely to the first annular element 25, by means of a second annular element 28 and a plurality of rods 27 (here arranged at 12 o'clock and at 6 o'clock). The prisms 24, 24', the annular elements 25, 28 and the connecting rods 27 are made of a rigid material, for example metal.

Preferably, the downstream section 20 comprises at least two angularly equidistant means 24, 24' (e.g., angularly positioned at 6 o'clock and 12 o'clock) for, in particular, pushing the annular elements 25, 28 and the connecting rods 27.

As can be seen in FIG. 8, the prisms 24 of the first annular row (which is closest to the intermediate section 30) and the prisms 24' of the second annular row (which is closest to the outlet cross-section BF) have different dimensions. In particular, the prisms 24' have a summit angle θ' less than the summit angle θ of the prisms 24. In fact, in order to move the downstream section 20 of the nacelle fairing 3 from a neutral position to an asymmetrical position, the internal 20a and external 20b walls undergo displacements of variable amplitude increasing as they approach the outlet cross-section, the prisms 24, 24' thus being configured to allow this variable amplitude of radial displacement of the internal 20a and external 20b walls for a same axial displacement of the annular elements 25, 28.

In order to divert the flow upwards, for example, the actuator mechanism with cylinders 23 is operated. The actuation of the actuator mechanism with cylinders 23 causes the extension of the cylinder arm 26, which causes the axial displacement of the annular element 25 (in the direction of the arrow F6), which in turn causes the radially external displacement of the row of prisms 24 (in the direction of arrow F7) and the axial displacement of the rods 27 and of the second annular element 28 (in the direction of the arrow F8), which in turn causes the radially external displacement of the second row of prisms 24' (in the direction of the arrow F9). Because the prisms 24, 24' are embedded in the radially internal surface 20b' of the radially external wall 20b and the annular elements 25, 28 are rigid, the dimensions of the upper portion of the radially internal wall 20a increase under the effect of the radial thrust of the prisms 24, 24'. This increase in dimensions leads to a change in the shape of the upper portion of the outlet cross-section BF. The cooperation between the cylinder 23, the annular elements 25, 28, the rods 27 and the prisms 24, 24' deforms the radially external wall 20b in a direction radial relative to the axis X of rotation and angularly centred with respect to the angular sector over which the prisms 24, 24' associated with the cylinder 23 extend. The cylinder 23 is thus activated, while the cylinder 23' is not activated. In particular, the lower portions of the annular elements 25, 28 do not move on the faces of the prisms 24, 24' facing the cylinder 23'. The actuation of the cylinder 23 results in a local deformation, i.e. a local and radial expansion of the outlet cross-section BF. There is a local radial increase in the radially external wall 20b (at the level of the prisms 24, 24' which face the actuated cylinder 23). In order to divert the flow downwards, for example, the actuator mechanism with cylinders 23' is actuated. The actuation of the actuator mechanism with cylinders 23' causes the extension of the cylinder arm 26', which causes the axial displacement of the annular element 25 (in the direction of the arrow F10), which in turn causes the radially external displacement of the row of prisms 24 (in the direction of the arrow F11) and the axial displacement of the rods 27 and of the second annular element 28 (in the direction of the arrow F12), which in turn causes the radially external displacement of the second row of prisms 24' (in the direction of the arrow F13). Because the prisms 24, 24' are embedded in the radially internal surface 20b' of the radially external wall 20b and the annular elements 25, 28 are rigid, the dimensions of the lower portion of the radially internal wall 20a increase under the effect of the radial thrust of the prisms 24, 24'. This increase in dimensions leads to a change in the shape of the lower portion of the outlet cross-section BF. The cooperation between the cylinder 23', the annular elements 25, 28, the rods 27 and the prisms 24, 24' deforms the radially external wall 20b in a direction radial to the axis X of rotation and angularly centred with respect to the angular sector over which the prisms 24, 24' associated with the cylinder 23' extend. The cylinder 23' is thus activated, while the cylinder 23 is not. In particular, the upper portions of the annular elements 25, 28 do not move on the faces of the prisms 24, 24' facing the cylinder 23. The actuation of the cylinder 23' results in a local deformation, i.e. a local and radial expansion of the outlet cross-section BF. There is a local radial increase in the radially external wall 20b (at the level of the prisms 24, 24' which face the actuated cylinder 23').

The invention has primarily been described for a propulsion system comprising one annular element and two cylinders, but the propulsion system may of course comprise a plurality of annular elements and more cylinders.

The invention claimed is:

1. A propulsion system for an aircraft, comprising at least one rotor and a nacelle fairing extending around said at least one rotor with respect to an axis of rotation of said rotor, the nacelle fairing comprising an upstream section forming an inlet cross-section of the nacelle fairing and a downstream section, a downstream end of the downstream section forming an outlet cross-section of the nacelle fairing, wherein the downstream section comprises a radially internal wall and a radially external wall made of a deformable shape-memory material, the radially external wall comprising a plurality of actuator mechanisms with at least one cylinder, each actuator mechanism being operable independently of the other actuator mechanisms and being configured to cooperate with means embedded in an internal surface of the radially external wall so as to deform the radially external wall in a radial direction with respect to the axis of rotation, under the effect of a predetermined displacement command.

2. The propulsion system according to claim 1, wherein the means comprise a plurality of prisms distributed on the internal surface of the radially external wall in at least one annular row.

3. The propulsion system of claim 2, wherein the prisms are angularly equidistant on the internal surface of the radially external wall.

4. The propulsion system according to claim 1, wherein the prisms are actuated by the cylinders by means of at least one annular element.

5. The propulsion system according to claim 1, wherein the cylinders are angularly equidistant in the downstream section.

6. The propulsion system according to claim 1, wherein the plurality of actuator mechanisms with at least one cylinder comprises a first actuator mechanism with at least one cylinder wherein the cylinder is configured to cooperate with the means so as to deform the radially external wall in a first radial direction relative to the axis of rotation, under the effect of a predetermined displacement command, and a second actuator mechanism with at least one cylinder, wherein the cylinder is configured to cooperate with the means so as to deform the radially external wall in a second direction, which is opposite to the first direction, under the effect of a predetermined displacement command.

7. The propulsion system according to claim 1, further comprising stiffening bridges connecting the radially internal and radially external walls of the downstream section.

8. The propulsion system according to claim 1, wherein the nacelle fairing further comprises an upstream section forming an inlet cross-section of the nacelle fairing and an intermediate section connecting the upstream and downstream sections, and wherein the intermediate section is rigid and is connected by at least one mast to an engine of the propulsion system.

9. An aircraft, comprising at least one propulsion system according to claim 1, the propulsion system being mounted so as to pivot on the aircraft by means of a pivot shaft that is offset from or passes through the rotor.

* * * * *